US008446460B2

(12) United States Patent
Chang

(10) Patent No.: US 8,446,460 B2
(45) Date of Patent: May 21, 2013

(54) AUTOSTEREOSCOPIC DISPLAY

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 380 days.

(21) Appl. No.: 12/845,702

(22) Filed: Jul. 28, 2010

(65) Prior Publication Data

US 2011/0170183 A1    Jul. 14, 2011

(30) Foreign Application Priority Data

Jan. 8, 2010 (CN) .......................... 2010 1 0300158

(51) Int. Cl.
*H04N 13/04* (2006.01)
(52) U.S. Cl.
USPC ............................................. 348/51; 348/59
(58) Field of Classification Search
USPC ................................................. 348/51, 59, 47
See application file for complete search history.

(56) References Cited

U.S. PATENT DOCUMENTS

| | | | | | |
|---|---|---|---|---|---|
| 3,558,832 | A | * | 1/1971 | Bonis et al. | 379/424 |
| 3,770,137 | A | * | 11/1973 | Slutsky et al. | 212/315 |
| 4,167,082 | A | * | 9/1979 | Kolb | 451/6 |
| 4,717,949 | A | * | 1/1988 | Eichenlaub | 348/54 |
| 4,773,055 | A | * | 9/1988 | Gijzen et al. | 369/44.16 |
| 5,073,883 | A | * | 12/1991 | Mitsumori | 369/44.15 |
| 5,192,969 | A | * | 3/1993 | Igarashi et al. | 355/22 |
| 5,199,875 | A | * | 4/1993 | Trumbull | 434/62 |
| 5,280,402 | A | * | 1/1994 | Anderson et al. | 360/261.3 |
| 5,410,345 | A | * | 4/1995 | Eichenlaub | 348/59 |
| 5,433,670 | A | * | 7/1995 | Trumbull | 472/60 |
| 5,699,131 | A | * | 12/1997 | Aoki et al. | 348/832 |
| 5,742,441 | A | * | 4/1998 | Grassens et al. | 359/822 |
| 5,966,167 | A | * | 10/1999 | Nose et al. | 348/59 |
| 5,978,143 | A | * | 11/1999 | Spruck | 359/619 |
| 6,326,994 | B1 | * | 12/2001 | Yoshimatsu | 348/46 |
| 6,407,888 | B1 | * | 6/2002 | Crane | 360/244.5 |
| 6,567,126 | B1 | * | 5/2003 | Slatter et al. | 348/345 |
| 7,355,317 | B2 | * | 4/2008 | Greywall | 310/309 |
| 7,573,660 | B2 | * | 8/2009 | Chang | 359/822 |
| 7,692,521 | B1 | * | 4/2010 | Cohn | 335/78 |
| 2003/0076604 | A1 | * | 4/2003 | Hagood et al. | 359/822 |
| 2003/0081996 | A1 | * | 5/2003 | Sun et al. | 403/381 |
| 2004/0188584 | A1 | * | 9/2004 | Chuang | 248/346.06 |
| 2005/0135439 | A1 | * | 6/2005 | Chapman et al. | 372/20 |
| 2006/0138296 | A1 | * | 6/2006 | Deluga | 248/346.01 |
| 2006/0146046 | A1 | * | 7/2006 | Longhurst et al. | 345/418 |
| 2006/0238069 | A1 | * | 10/2006 | Maruyama et al. | 310/316.01 |
| 2007/0240347 | A1 | * | 10/2007 | Chang | 40/601 |

* cited by examiner

*Primary Examiner* — Sath V Perungavoor
*Assistant Examiner* — Peter D Le
(74) *Attorney, Agent, or Firm* — Altis Law Group, Inc.

(57) ABSTRACT

An autostereoscopic display includes a display panel, a lenticular lens assembly, a driver, a number of camera modules, and a controller. The lenticular lens assembly includes an array of cylindrical lenses and is rotatably hung above the display panel. The driver is configured for driving the lenticular lens assembly to rotate about an axis that is substantially parallel to the lengthwise direction of the cylindrical lenses. The camera modules are arranged beside the display panel and oriented at different angles. The controller is configured for controlling the camera modules to take images in sequence and controlling the driver to rotate the lenticular lens assembly to an orientation at the same angle as a corresponding camera module when the display panel plays an image taken by the camera module.

4 Claims, 3 Drawing Sheets

AUTOSTEREOSCOPIC DISPLAY

BACKGROUND

1. Technical Field

The present disclosure relates to displays and, particularly, to an autostereoscopic display.

2. Description of Related Art

Most current autostereoscopic displays have a limited angle of view caused by a limited angle of view of a lenticular lens array employed.

Therefore, it is desirable to provide a new autostereoscopic display, which can overcome the above-mentioned limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail with reference to the drawings.

Figure 1:
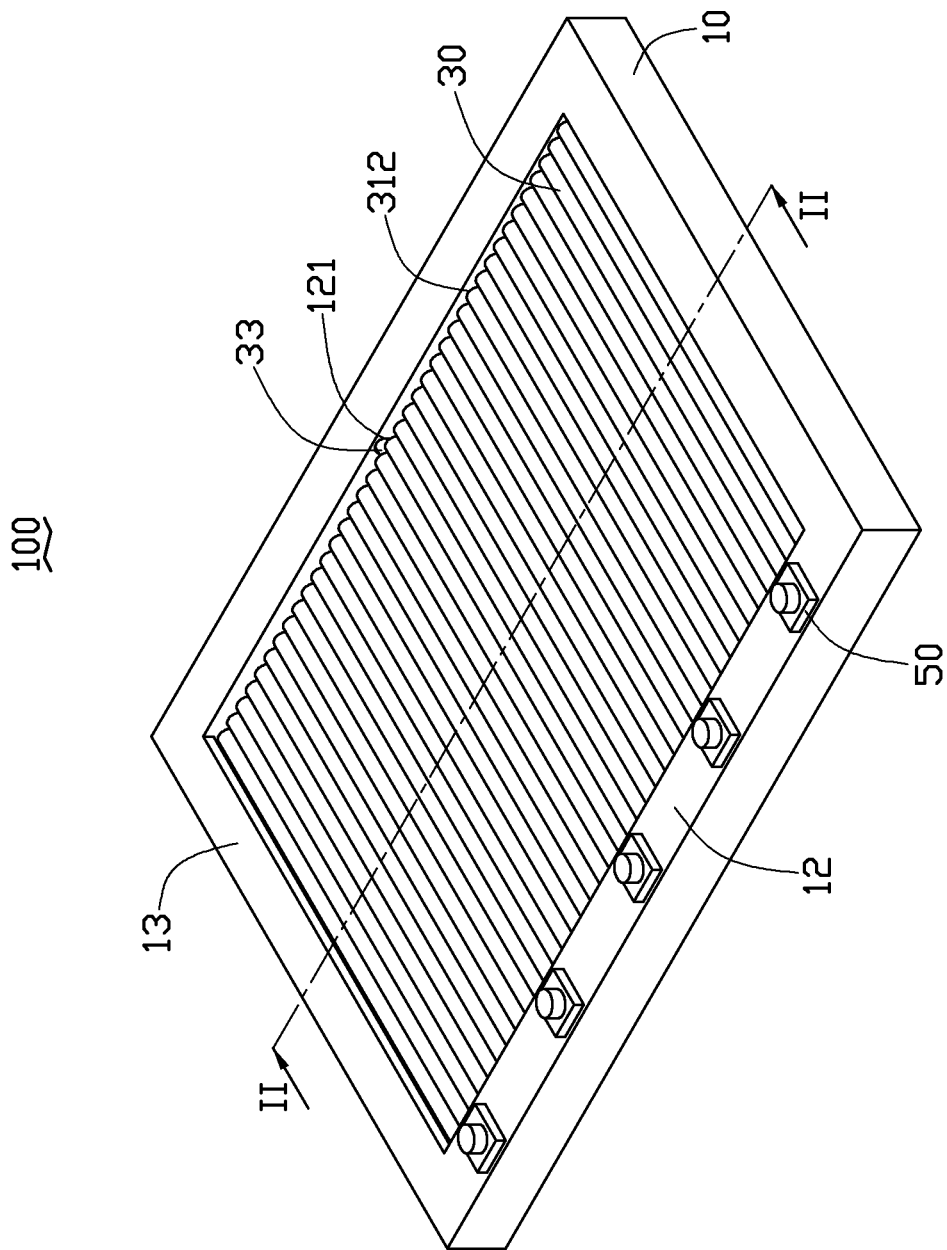
FIG. 1 is a schematic view of an autostereoscopic display according to an embodiment.
Figure 2:
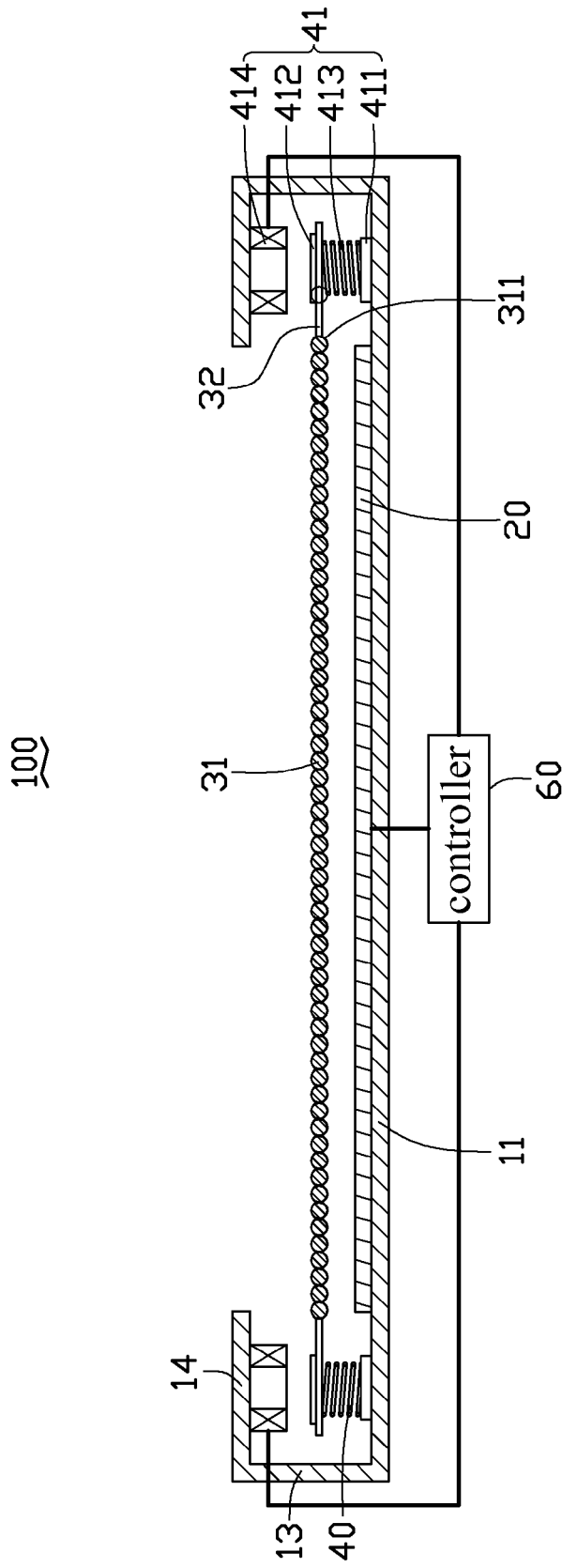
FIG. 2 is a cross-sectional view of the autostereoscopic display taken along a line II-II of FIG. 1.

Referring to FIGS. 1 and 2, an autostereoscopic display 100, according to an embodiment, includes a frame 10, a display panel 20, a lenticular lens assembly 30, a driver 40, five camera modules 50, and a controller 60.

The frame 10 includes a rectangular carrying plate 11, a pair of parallel first side plates 12 and second side plates 13 extending upward from four edges of the carrying plate 11, and a pair of cantilever plates 14, each of which extends from an edge of a corresponding second side plate 13 distant from the carrying plate 11 and toward the other second side plate 13. The cantilever plates 14 are much shorter than the carrying plate 11 in the lengthwise direction of the first side plate 12, thus defining an opening (not labeled) that exposes the carrying plate 11. Each first side plate 12 defines a shaft hole 121, generally at the center thereof. The two shaft holes 121 are substantially aligned with each other. However, one shaft hole 121 is slightly closer to the carrying plate 11 than the other shaft hole 121.

The lenticular lens assembly 30 includes a rectangular lenticular lens 31 that includes an array of cylindrical lenses, two connecting plates 32, and two shafts 33. The two connecting plates 32 extend from two respective opposite edges of the lenticular lens 31 along a direction substantially perpendicular to the lengthwise direction of the cylindrical lenses. The two shafts 33 extend outward from the other two respective opposite edges of the lenticular lens 31, generally at the center thereof, along the lengthwise direction of the cylindrical lenses.

The driver 40 includes two electromagnetic actuators 41. Each actuator 41 includes a first magnet 411, a second magnet 412, an elastic member 413, and a winding 414.

In assembly, the display panel 20 such as a liquid crystal display (LCD) panel is framed by the frame 10, disposed on the carrying plate 11, beneath the cantilever plates 14, and exposed by the opening.

The shafts 33 rotatably fit into the shaft holes 121 respectively. Thus, the lenticular lens assembly 30 is rotatably connected to the frame 10, above the display panel 20 in a slant.

The first magnets 411 are disposed on the carrying plate 11, beneath the respective connecting plates 32. The second magnets 412 are secured to the respective connecting plates 32 and are aligned with the respective magnets 411. The elastic members 413 connect the respective connecting plates 32 to the carrying plate 11. The first magnets 411 repel the respective second magnets 414. The elastic members 413 stretch to apply elastic attractive forces on the connecting plates 32 to balance the lenticular lens assembly 30. The windings 414 are secured to the respective cantilever plates 14 and connect to adjustable power sources. Thus, the windings 414 can generate different polarities and magnitudes of electromagnetic fields to attract or repel the respective first magnets 411 and second magnets 412. As such, the lenticular lens assembly 30 can rotate about the shafts 33 10° to −10° (see FIG. 3), with respect to the lengthwise direction of the side plates 12.

The camera modules 50 are mounted to one of the side plates 12, equidistantly arranged along the lengthwise direction of the side plate 12. However, the camera modules 50 are respectively tilted in relation to each other by 10°, 5°, 0° (horizontal), −5°, and −10° with respect to the lengthwise direction of the side plates 12.

Figure 3:
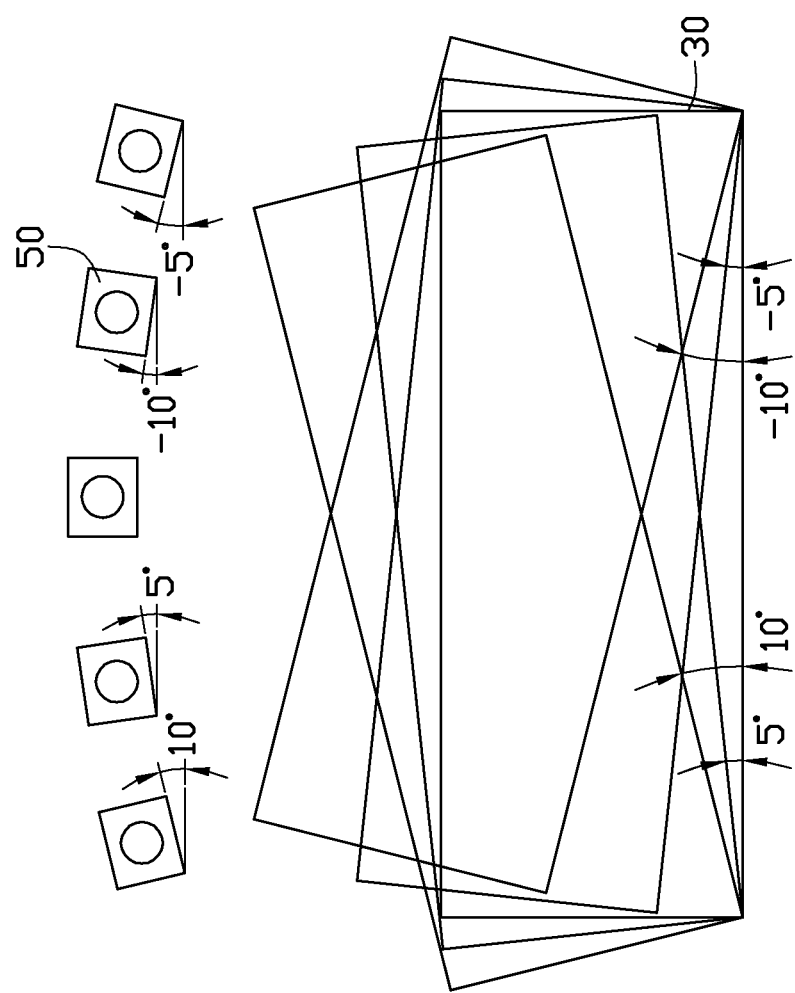
FIG. 3 is a schematic view showing a working principle of the autostereoscopic display of FIG. 1.

Also referring to FIG. 3, in operation, the controller 60 controls the cameras modules 50 to take images in sequence at every 1/120 of a second as a video. That is, the video comprises a first image taken by the 10°-tilted camera module 50, then a second image taken at 1/120 of second later by the 5°-tilted camera module 50, then a third image taken 1/120 of a second later by the horizontal camera module 50, then a fourth image taken 1/120 of a second later by the −5°-tilted camera module 50, then a fifth image taken 1/120 of a second later by the −10°-tilted camera module 50, and so on. When playing the video, the controller 60 controls the polarities and magnitudes of currents or voltages applied to the windings 414 to adjust the electromagnetic fields generated by the windings 414 as desired. Thus, the lenticular lens assembly 30 is rotated to the positions when displaying the images that are taken by the corresponding camera modules 50. For example, the lenticular lens assembly 30 is rotated to the 10°-tilted position when playing the images taken by the 10°-tilted camera module 50, to the 5°-tilted position when playing the images taken by the 5°-tilted camera module 50, and so on.

Since the lenticular lens assembly 30 can tilt, the total angle of view of the autostereoscopic display 100 is expanded.

It is noteworthy that the frame 10 is not limited to the configuration of this embodiment. Other configurations of the frame can be employed in other embodiments to install the display panel 20, the lenticular lens assembly 30, the driver 40, and the camera modules 50 thereto.

The number of the positions of the lenticular lens assembly 30 and the camera modules 50 can be other than five in other embodiments. The tilt angles of the lenticular lens assembly 30 and the camera modules 50 can be redesigned depending on requirements in other embodiments too.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An autostereoscopic display, comprising:
   a display panel;
   a lenticular lens assembly comprising a lenticular lens composed of an array of cylindrical lenses and rotatably hung above the display panel;
   a driver configured for driving the lenticular lens assembly to rotate about an axis that is substantially parallel to the lengthwise direction of the cylindrical lenses;
   a plurality of camera modules arranged beside the display panel and oriented at different angles; and
   a controller configured for controlling the camera modules to take images in sequence and controlling the driver to rotate the lenticular lens assembly to be oriented at the same angle as a corresponding camera module when the display panel plays an image taken by the corresponding camera module.

2. The autostereoscopic display of claim 1, further comprising a frame, the frame comprising a rectangular carrying plate, a pair of parallel first side plate and second side plates, and a pair of cantilever plates, the first plates and the second plates extending upward from four edges of the carrying plate, each cantilever plate extending from an edge of a corresponding second plate distant from the carrying plate and toward the other second side plate; the display panel being positioned on the carrying plate and exposed by an opening defined between the cantilever plates; the lenticular lens assembly being rotatably connected to the first side plates.

3. The autostereoscopic display of claim 2, wherein each first side plate defines a shaft hole, the two shaft holes are substantially aligned with each other, one of the shaft holes is slightly closer to the carrying plate than the other; the lenticular lens array extends two shafts from two respective edges of the lenticulalr lens perpendicular to the lengthwise direction of the cylindrical lenses, the shafts are rotatably received in the respective shaft holes.

4. The autostereoscopic display of claim 2, wherein the lenticular lens assembly comprises two connecting plates, the connecting plates extend outward from two respective edges of the lenticular lens and are positioned parallel to the lengthwise direction of the cylindrical lenses; the driver includes two electromagnetic actuators, each of which is configured for driving a corresponding connecting plate to move towards or away from the carrying plate, each actuator comprises a first magnet, a second magnet, an elastic member, and a winding, the first magnets are positioned on the carrying plate, beneath the respective connecting plates; the second magnets are secured to the respective connecting plates, the elastic members connect the respective connecting plates to the carrying plate and are configured for balancing magnetic forces generated between the first magnets and the second magnets, the windings are secured to the respective cantilever plates and connect to an adjustable power source.

* * * * *